(12) United States Patent
Ezrielev et al.

(10) Patent No.: US 12,468,541 B2
(45) Date of Patent: Nov. 11, 2025

(54) CURATING ANOMALOUS DATA FOR USE IN A DATA PIPELINE THROUGH INTERACTION WITH A DATA SOURCE

(71) Applicant: Dell Products L.P., Round Rock, TX (US)

(72) Inventors: Ofir Ezrielev, Beer Sheva (IL); Hanna Yehuda, Acton, MA (US); Kristen Jeanne Walsh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/343,930

(22) Filed: Jun. 29, 2023

(65) Prior Publication Data
US 2025/0004783 A1     Jan. 2, 2025

(51) Int. Cl.
*G06F 9/38* (2018.01)

(52) U.S. Cl.
CPC .......... *G06F 9/3867* (2013.01); *G06F 9/3895* (2013.01)

(58) Field of Classification Search
CPC .................................................... G06F 9/3867
USPC .......................................................... 707/752
See application file for complete search history.

(56) References Cited

U.S. PATENT DOCUMENTS

| | | | |
|---|---|---|---|
| 7,315,805 B2 | 1/2008 | Slater | |
| 9,990,383 B2 | 6/2018 | Brinnand | |
| 10,168,691 B2 | 1/2019 | Zornio et al. | |
| 10,936,479 B2 | 3/2021 | Maag et al. | |
| 11,101,037 B2 | 8/2021 | Allen | |
| 11,221,270 B2 | 1/2022 | Evans | |
| 11,341,605 B1 | 5/2022 | Singh | |
| 11,853,853 B1 * | 12/2023 | Beauchesne | G06N 5/01 |
| 12,008,046 B1 * | 6/2024 | Curtis | G06F 16/90335 |
| 12,216,651 B2 | 2/2025 | Krishnan | |
| 12,242,892 B1 | 3/2025 | Burnett | |

(Continued)

OTHER PUBLICATIONS

Wang, Haozhe, et al., "A graph neural network-based digital twin for network slicing management," IEEE Transactions on Industrial Informatics 18.2 (2020): 1367-1376 (11 Pages).

(Continued)

*Primary Examiner* — Muluemebet Gurmu
(74) *Attorney, Agent, or Firm* — WOMBLE BOND DICKINSON (US) LLP (57) ABSTRACT

Methods and systems for curating data by a data manager are disclosed. Data may be curated from various data sources before being provided to downstream consumers that may rely on the trustworthiness of the curated data in order to provide desired computer-implemented services. During the data curation process, data curation resources are used to improve the trustworthiness and/or value of the collected data. However, data curation resources (e.g., data curators, computing resources) may be limited and/or insufficient to perform the data curation process as desired, which may result in unusable and/or uncurated (e.g., untrustworthy) data. Thus, the data may be screened for anomalous data points. Features of the anomalous data points that meet importance criteria may be presented to the data source and the data source may indicate whether the features are expected. If the features are expected, the data pipeline may be populated with the anomalous data points.

20 Claims, 6 Drawing Sheets

(56) References Cited

U.S. PATENT DOCUMENTS

| | | |
|---|---|---|
| 2004/0064750 A1 | 4/2004 | Conway |
| 2006/0009881 A1 | 1/2006 | Ferber et al. |
| 2013/0205285 A1 | 8/2013 | Pizlo |
| 2013/0227573 A1 | 8/2013 | Morsi |
| 2014/0037161 A1 | 2/2014 | Rucker |
| 2014/0136184 A1 | 5/2014 | Hatsek |
| 2016/0098037 A1 | 4/2016 | Zornio |
| 2018/0081871 A1 | 3/2018 | Williams |
| 2019/0034430 A1 | 1/2019 | Das |
| 2019/0236204 A1 | 8/2019 | Canim |
| 2019/0251479 A1 | 8/2019 | Anderson et al. |
| 2020/0166558 A1 | 5/2020 | Weis |
| 2020/0167224 A1 | 5/2020 | Abali |
| 2020/0202478 A1 | 6/2020 | Thumpudi et al. |
| 2020/0293684 A1 | 9/2020 | Harris |
| 2021/0027771 A1 | 1/2021 | Hall |
| 2021/0116505 A1 | 4/2021 | Shu |
| 2021/0374143 A1 | 12/2021 | Neill |
| 2021/0377286 A1 | 12/2021 | Shukla et al. |
| 2021/0406110 A1* | 12/2021 | Vaid ............... G06F 18/251 |
| 2022/0092234 A1 | 3/2022 | Karri |
| 2022/0301027 A1 | 9/2022 | Basta |
| 2022/0310276 A1 | 9/2022 | Wilkinson |
| 2023/0014438 A1 | 1/2023 | Jones |
| 2023/0040834 A1 | 2/2023 | Haile |
| 2023/0126260 A1* | 4/2023 | Elsakhawy ............. H04L 41/16 709/224 |
| 2023/0153095 A1 | 5/2023 | Rahill-Marier |
| 2023/0161596 A1 | 5/2023 | Vadapandeshwara |
| 2023/0196096 A1 | 6/2023 | Milne |
| 2023/0213930 A1 | 7/2023 | Rakshit |
| 2023/0315078 A1 | 10/2023 | Sepulveda et al. |
| 2023/0418280 A1 | 12/2023 | Emery |
| 2024/0126888 A1 | 4/2024 | Kalou et al. |
| 2024/0235952 A9 | 7/2024 | Hicks |
| 2024/0281419 A1 | 8/2024 | Alfaras |
| 2024/0281522 A1 | 8/2024 | Kuo |
| 2024/0330136 A1 | 10/2024 | Furlong |
| 2024/0412104 A1 | 12/2024 | Zhang |

OTHER PUBLICATIONS

Almasan, Paul, et al., "Digital Twin Network: Opportunities and challenges," arXiv preprint arXiv:2201.01144 (2022) (7 Pages).

Hu, Weifei, et al., "Digital twin: A state-of-the-art review of its enabling technologies, applications and challenges," Journal of Intelligent Manufacturing and Special Equipment 2.1 (2021): 1-34 (34 Pages).

Khan, Latif U., et al., "Digital-Twin-Enabled 6G: Vision, Architectural Trends, and Future Directions," IEEE Communications Magazine 60.1 (2022): 74-80 (7 Pages).

Nguyen, Huan X., et al., "Digital Twin for 5G and Beyond," IEEE Communications Magazine 59.2 (2021): 10-15. (12 Pages).

Wang, Danshi, et al., "The Role of Digital Twin in Optical Communication: Fault Management, Hardware Configuration, and Transmission Simulation," IEEE Communications Magazine 59.1 (2021): 133-139 (6 Pages).

Pang, Toh Yen, et al., "Developing a digital twin and digital thread framework for an 'Industry 4.0' Shipyard," Applied Sciences 11.3 (2021): 1097 (22 Pages).

Isto, Pekka, et al., "5G based machine remote operation development utilizing digital twin," Open Engineering 10.1 (2020): 265-272 (8 Pages).

Redick, William, "What is Outcome-Based Selling?" Global Performance, Web Page <https://globalperformancegroup.com/what-is-outcome-based-selling/> accessed on Feb. 14, 2023 (8 Pages).

"The Best Data Curation Tools for Computer Vision in 2022," Web Page <https://www.lightly.ai/post/data-curation-tools-2022> accessed on Feb. 14, 2023 (9 Pages).

Bebee, Troy et al., "How to detect machine-learned anomalies in real-time foreign exchange data," Google Cloud, Jun. 10, 2021, Web Page <https://cloud.google.com/blog/topics/financial-services/detect-anomalies-in-real-time-forex-data-with-ml>accessed on Feb. 14, 2023 (16 Pages).

Wang, Haozhe, et al., "A graph neural network-based digital twin for network slicing management," IEEE Transactions on Industrial Informatics 18.2 (2020): 1367-1376 (10 Pages).

Bosch et al., "Towards Automated Detection of Data Pipeline Faults", 2020 27th Asia-Pacific Software Engineering Conference (APSEC). IEEE, pp. 346-355 (Year: 2020).

Grafberger et al., Towards Interactively Improving ML Data Preparation Code via "Shadow Pipelines", DEEM '24: Proceedings of the Eighth Workshop on Data Management for End-to-End Machine Learning, published on Jun. 9, 2024, retrieved from <https://doi.org/10.1145/3650203.3663327> on Aug. 11, 2025 (5 pages).

Chowdhury et al., "An Approach for Data Pipeline with Distributed Query Engine for Industrial Applications", published in 2020 25th IEEE International Conference on Emerging Technologies and Factory Automation (ETFA), retrieved from <https://ieeexplore.ieee.org/stamp/stamp.jsp?tp=&arnumber=9212050> on Sep. 9, 2025 (4 pages).

* cited by examiner

CURATING ANOMALOUS DATA FOR USE IN A DATA PIPELINE THROUGH INTERACTION WITH A DATA SOURCE

FIELD

Embodiments disclosed herein relate generally to data management. More particularly, embodiments disclosed herein relate to systems and methods to improve data curation processes.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for curating data from data sources prior to addition to (e.g., being stored in) a data repository. Data curation may include obtaining data from various data sources and/or storing the data in one or more data repositories. A data repository of the one or more data repositories may be managed by a data manager that may also manage the data curation process. Data curation may include processes such as collecting, organizing (e.g., indexing, labeling, cataloging, etc.), preserving, and/or maintaining data for use by consumers. For example, downstream consumers of curated data may rely on raw and/or processed data being made accessible to provide computer-implemented services.

Data curation processes may improve the value of data collected from various data sources (e.g., that may provide inconsistent and/or disorganized datasets). For example, data curation may remediate inaccurate data (e.g., data that includes incorrect information, knowledge gaps, erroneous anomalies, etc.). Inaccurate data may be untrustworthy (e.g., biased, unreliable, etc.) for use in downstream applications (e.g., downstream consumption that may facilitate computer-implemented services). Thus, the data curation process may increase the value of the collected data by improving its usability, accessibility, and/or trustworthiness.

The data curation process may utilize data curation resources (e.g., one or more data curators using one or more data processing systems, computing resources consumed by the data processing systems, etc.) to generate curated data from data collected from various sources and/or read from various data repositories. However, if insufficient data curation resources are available to perform the data curation, then it may not be possible to curate the collected data in the desired manner (e.g., the resulting curated data complying with a schema for downstream use). This may lead to (i) an inability to provide curated data to downstream consumers (e.g., which may result in a stoppage of computer-implemented services), and/or (ii) providing untrustworthy (e.g., uncurated) data to downstream consumers.

In addition, anomalies in the data may be identified as part of the data curation process. Anomalous data points (e.g., data points associated with the data that include anomalies) may include features that are verifiable by a data curator. Features may include any portion of textual information (e.g., letters, words), numerical information, and/or other information associated with the data point. However, some anomalous data points may include features that are not easily verifiable by a data curator. For example, some features may be based on user feedback, qualitative observations, and/or other types of information that may prove difficult to curate without input from a user who supplied the information. Therefore, portions of the data may remain uncurated due to limitations on the ability of the data curation resources to effectively verify anomalous data points including certain features.

Thus, the consumption of uncurated data (and/or partially curated data) may pose a risk to downstream consumers (e.g., quality of the computer-implemented services facilitated by the downstream consumers may be impacted, etc.). Therefore, when data curation resources are limited and/or insufficient, the data curation process may include requesting that the data source (e.g., the source of data for data curation) participate in the data curation process.

To do so, anomaly detection may be performed using data from the data source to identify anomalous data points in the data. If an anomalous data point is detected, a set of features (e.g., letters, words, numbers, etc.) associated with the anomalous data point may be identified. Each feature of the set of the features may be compared to importance criteria to identify one or more features that contributed (to a degree indicated by the importance criteria) to the anomaly being detected in the data point. The at least one feature may, therefore, be provided to the data source for verification. The data source may verify the at least one feature (e.g., confirm that the at least one feature is expected), may correct the feature (e.g., provide an alternative feature for the at least one feature based on the at least one feature being unexpected), and/or may provide other information. The data pipeline may be populated with a final data point for the anomalous data point based on the feedback obtained from the data source.

Consequently, embodiments disclosed herein may provide a system for curating data (e.g., reducing occurrences of erroneous anomalous data points in the data) while reducing curation resource consumption. The data curation process may be improved by requesting participation in the data curation process by the data source that provided the data for curation. The data source may be asked to validate and/or review a portion of data, which may reduce the volume of data requiring curation using data curation resources and/or provide data curation for portions of the data that may prove challenging to curate without data source feedback. The resulting curated data may be more trustworthy (e.g., for downstream use) than uncurated (and/or partially curated) data and may therefore increase the likelihood of providing the downstream consumers with uninterrupted and/or reliable access to trustworthy data.

By doing so, an improved computing device and/or distributed system may be obtained. The improved device and/or system may be more likely to be able to provide the desired computer-implemented services.

In an embodiment, a method for curating data by a data manager is provided. The method may include: making an identification that data obtained from a data source associated with a data pipeline comprises an anomalous data point; identifying a feature of a set of features associated with the anomalous data point that meets importance criteria; obtaining a final data point based on the feature and through an interaction with the data source; and populating the data pipeline with the final data point.

The anomalous data point may be subject to multiple valid but contrasting interpretations.

The final data point may be based on one of the multiple valid but contrasting interpretations as selected by the data source through the interaction.

The interaction may include presenting information regarding the feature to the data source, the information being usable to confirm whether the feature is expected by the data source.

Obtaining the final data point may include: obtaining a response from the data source that is responsive to the information; in a first instance of the obtaining where the response confirms that the anomalous data point is expected: using the anomalous data point as the final data point; and in a second instance of the obtaining where the response rejects the anomalous data point as being expected: using a data source supplied data point from the response as the final data point.

The method may also include: removing the anomalous data point from the data pipeline.

The method may also include: providing computer-implemented services using the final data point from the populated data pipeline.

A non-transitory media may include instructions that when executed by a processor cause the computer-implemented method to be performed.

A data processing system may include the non-transitory media and a processor, and may perform the computer-implemented method when the computer instructions are executed by the processor.

Figure 1:
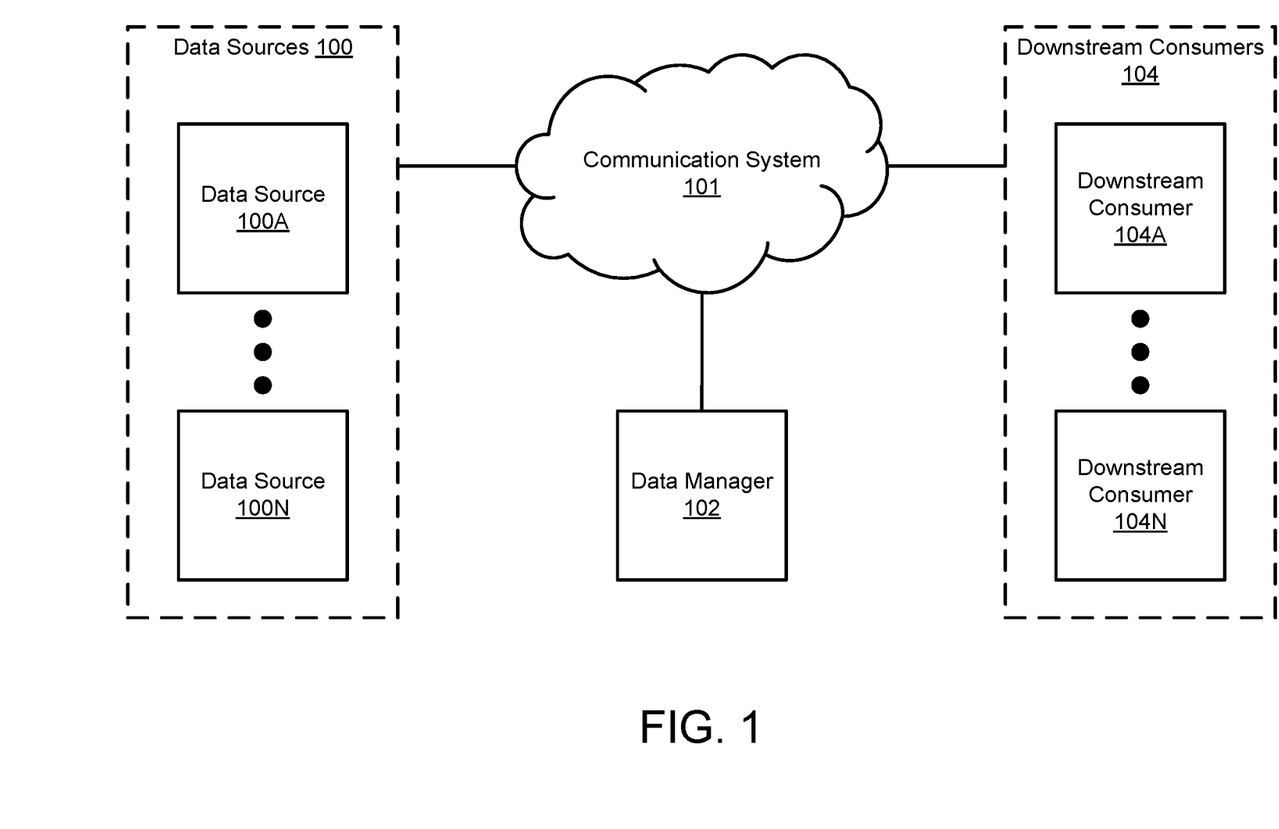
FIG. 1 shows a block diagram illustrating a system in accordance with an embodiment.

Turning to FIG. 1, a block diagram illustrating a system in accordance with an embodiment is shown. The system shown in FIG. 1 may provide computer-implemented services utilizing data obtained from any number of data sources and managed by a data manager prior to performing the computer-implemented services. The computer-implemented services may include any type and quantity of computer-implemented services. For example, the computer-implemented services may include monitoring services (e.g., of locations), communication services, and/or any other type of computer-implemented services.

The computer-implemented services may be performed, in part, by using artificial intelligence (AI) models (e.g., inference models). The inference models may, for example, be implemented with artificial neural networks, decision tress, regression analysis, and/or any other type of model usable for learning purposes. For example, data obtained from data sources 100 may be used as training data (e.g., used to train the inference models to perform the computer-implemented services), and/or as ingest data (e.g., used as input to the trained inference models in order to perform the computer-implemented services).

To facilitate the computer-implemented services, the system may include data sources 100. Data sources 100 may include any number of data sources. For example, data sources 100 may include one data source (e.g., data source 100A) or multiple data sources (e.g., 100A-100N). Each data source of data sources 100 may include hardware and/or software components configured to obtain data, store data, provide data to other entities, and/or to perform any other task to facilitate performance of the computer-implemented services.

All, or a portion, of data sources 100 may provide (and/or participate in and/or support the) computer-implemented services to various computing devices operably connected to data sources 100. Different data sources may provide similar and/or different computer-implemented services.

For example, data sources 100 may include any number of portable electronic devices associated with different users. The portable electronic devices (e.g., smartphones, tablets, laptop computers, fitness trackers, etc.) may be usable by the users (e.g., data sources 100) to provide personal information (e.g., a user's location, a user's age, a user's profession, a user's home address, etc.). Data sources 100 may be associated with a data pipeline and, therefore, may collect the personal information, may perform processes to sort, organize, format, and/or otherwise prepare the data for future processing in the data pipeline, and/or may provide the data to other data processing systems in the data pipeline (e.g., via one or more application programming interfaces (APIs)).

Data sources 100 may provide data to data manager 102. Data manager 102 may include any number of data processing systems including hardware and/or software components configured to facilitate performance of the computer-implemented services. Data manager 102 may include a database (e.g., a data lake, a data warehouse, etc.) to store data obtained from data sources 100 (and/or other entities throughout a distributed environment).

Data manager 102 may obtain data (e.g., from data sources 100), process the data (e.g., clean the data, transform the data, extract values from the data, etc.), store the data, and/or may provide the data to other entities (e.g., downstream consumer 104) as part of facilitating the computer-implemented services. Continuing with the above example, data manager 102 may obtain the personal information from data sources 100 as part of the data pipeline. Data manager 102 may obtain the personal information via a request through an API and/or via other methods.

The process of obtaining, organizing and/or integrating data collected from various data sources by data manager 102 may be referred to as data curation. Data curation may be performed by a data processing system of data manager 102 and/or a data processing system independent of data manager 102 (e.g., a third party).

Data curation may include any process that may improve the downstream usability of the collected data. For example, data curation may include processes and/or methods to remediate incomplete, irrelevant, and/or inaccurate data among the collected data. The results of data curation processes (e.g., curated data) may be stored and/or provided for downstream use. For example, curated data may be provided directly to downstream consumers (e.g., for statistical analysis), and/or as input to downstream processes (e.g., as training data and/or ingest data for inference modeling).

Continuing with the above example, data manager 102 may curate the personal information (e.g., identify errors/omissions and correct them, etc.) and may store the curated personal information temporarily and/or permanently in a data lake or other storage architecture. Following curating the personal information, data manager 102 may provide the personal information to other entities for use in performing the computer-implemented services.

Data managed by data manager 102 (e.g., stored in a data repository managed by data manager 102, etc.) may be provided to downstream consumers 104. Downstream consumers 104 may utilize the data from data sources 100 and/or data manager 102 to provide all, or a portion of, the computer-implemented services. For example, downstream consumers 104 may provide computer-implemented services to users of downstream consumers 104 and/or other computing devices operably connected to downstream consumers 104.

Downstream consumers 104 may include any number of downstream consumers (e.g., 104A-104N). For example, downstream consumers 104 may include one downstream consumer (e.g., 104A) or multiple downstream consumers (e.g., 104A-104N) that may individually and/or cooperatively provide the computer-implemented services.

All, or a portion, of downstream consumers 104 may provide (and/or participate in and/or support the) computer-implemented services to various computing devices operably connected to downstream consumers 104. Different downstream consumers may provide similar and/or different computer-implemented services.

Continuing with the above example, downstream consumers 104 may utilize the personal information via data manager 102 as input data for targeted advertising models. Specifically, downstream consumers 104 may utilize the personal information to simulate future purchasing habits of various users over time.

However, a quality and/or availability of computer-implemented services may be affected, at least in part, by a quality and/or availability of curated data. For example, uncurated data may be untrustworthy (e.g., due to poor quality, missing and/or incorrect data) and may negatively affect the computer-implemented services provided to and/or by downstream consumers. To avoid potential negative effects of uncurated data on the computer-implemented services, the downstream consumers may prefer to rely on curated data; however, if adequate volumes of curated data are not available, the associated computer-implemented services may be slowed, and/or suspended.

The quality and/or availability of curated data may depend on the quantity and/or availability of data curation resources. For example, the data collected from data sources 100 may include any number of data points. The resources used for data curation (e.g., data curators, computing resources, etc.) may be limited, which may result in an inability to curate all desired data points of the large volumes of data collected from data sources 100 in a given period of time.

In addition, data curation resources may experience limitations in their ability to curate certain types of data. Specifically, data points may include user supplied qualitative descriptions that are subjective to the user and, therefore, may not be verifiable by a data curator.

For example, a data curator may be responsible for curating portions of the large volumes of data (e.g., the data points). The data curator may not have sufficient curation bandwidth (e.g., a number of hours of labor and/or access to a quantity of computing resources) in order to perform the data curation process in the allotted time frame, which may result in uncurated data points (e.g., untrustworthy portions of data) persisting in the data.

Continuing with the above example regarding targeted advertising models, if insufficient volumes of curated data are available (e.g., leading to biased personal information samples) and/or if uncurated data (e.g., that may include irrelevant, missing, and/or incorrect personal information) is introduced in advertisement modeling, then the resulting targeted advertising models may be skewed. Further, the skewed targeted advertising models may negatively impact the simulations, which may prevent downstream consumers 104 from providing the desired computer-implemented services.

Thus, in cases where sufficient data curation resources may be unavailable to curate collected data (e.g., in a target period of time), at least a portion of the data points of the collected data may be presented to the data source (e.g., that provided the collected data) for review. For example, incoming data from a data source may be screened to identify anomalous data points. Each anomalous data point may include any number of features (e.g., letters, words, numbers, etc.). Each feature of a set of features associated with each anomalous data point may be compared to importance criteria. Doing so may identify features that contribute most significantly (e.g., to an extent indicated by the importance criteria) to the detection of the anomaly in the data point. Features meeting the importance criteria may be presented to the data source for review and the data source may indicate whether the features are expected by the data source (e.g., whether one or more errors are present in the features). The anomalous data point may be replaced with a final data point (based on the feedback from the data source) in the data pipeline and, therefore, curation resources may be allocated elsewhere. Doing so may increase the likelihood of curated data being made available to downstream consumers for use in providing computer-implemented services based on the curated data.

In general, embodiments disclosed herein may provide methods, systems, and/or devices for curating data based on available data curation resources. To provide its functionality, the system of FIG. 1 may (i) identify that data obtained from a data source associated with a data pipeline includes an anomalous data point, (ii) identify a feature of a set of features associated with the anomalous data point that meets importance criteria, (iii) obtain a final data point based on the feature and through an interaction with the data source, (iv) populate the data pipeline with the final data point.

Figure 2:
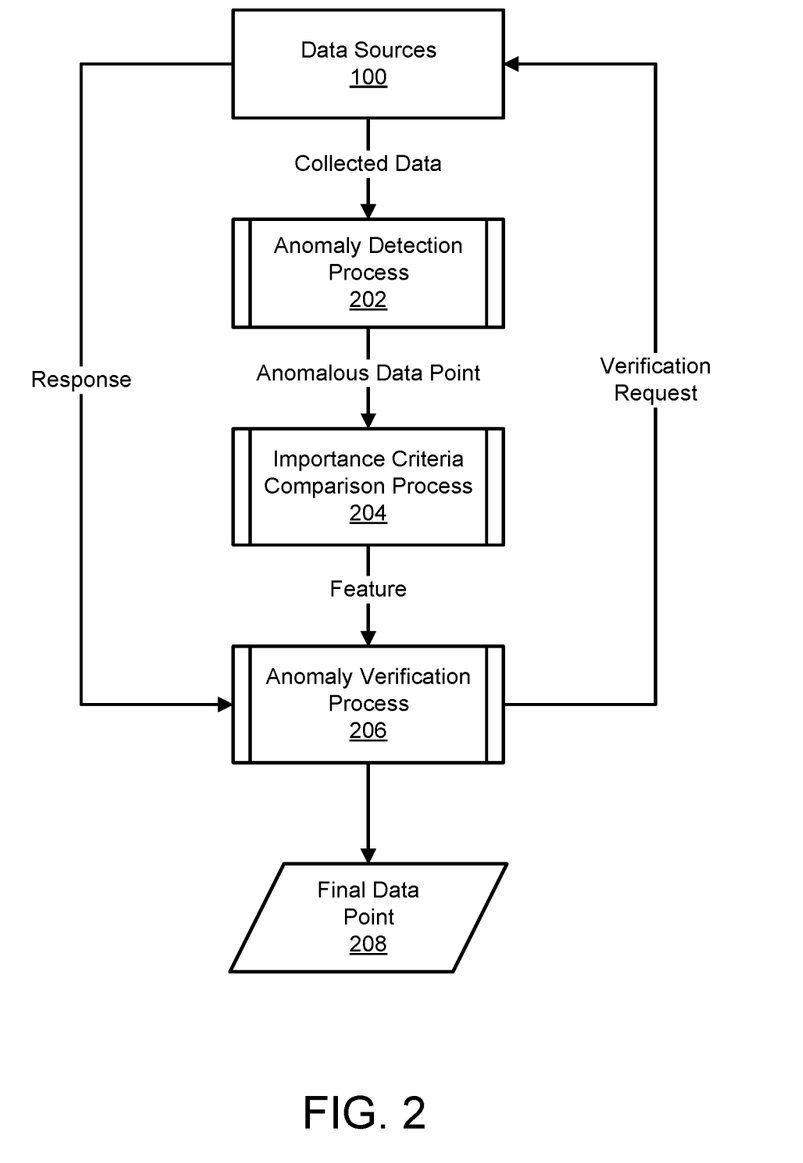
FIG. 2 shows a data flow diagram illustrating a process for curating data including an anomalous data point through interaction with a data source in accordance with an embodiment.
Figure 3A:
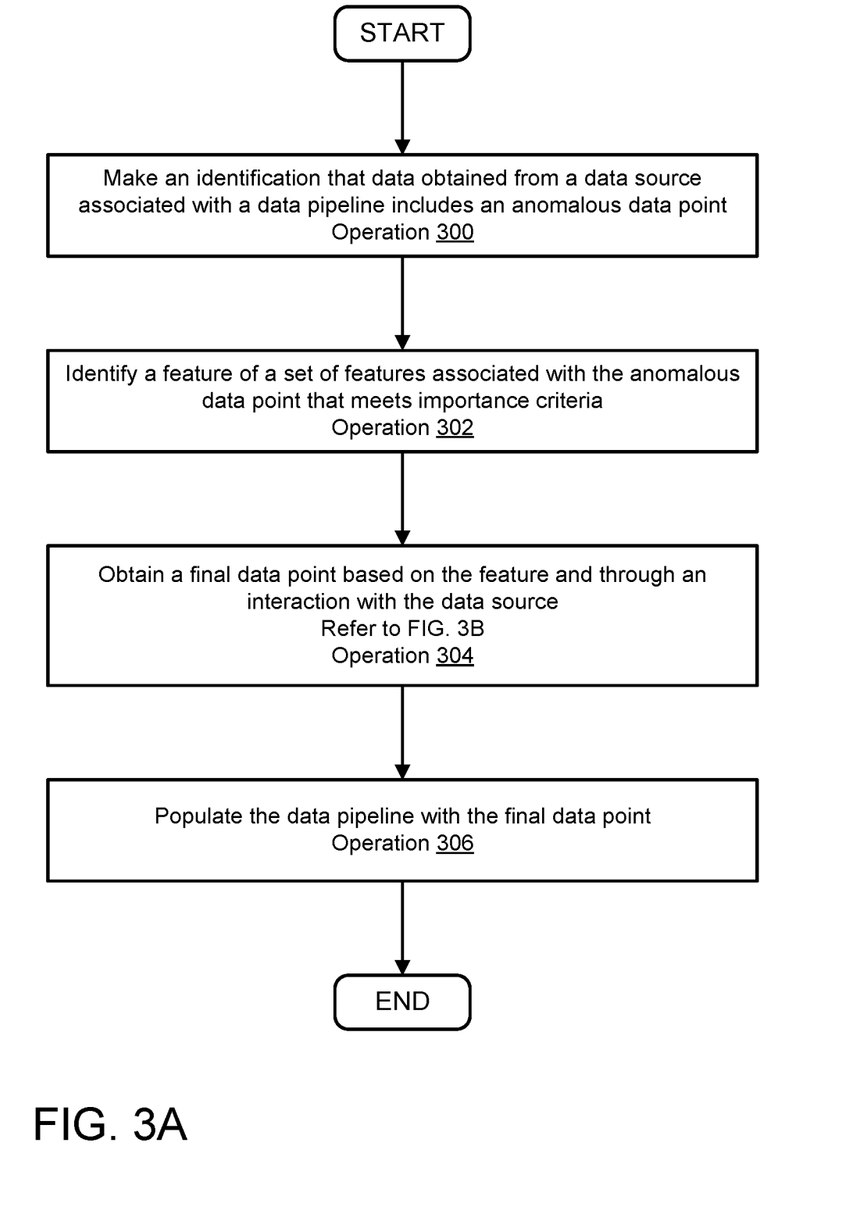
FIG. 3A shows a flow diagram illustrating a method for curating data including an anomalous data point through interaction with a data source in accordance with an embodiment.
Figure 3B:
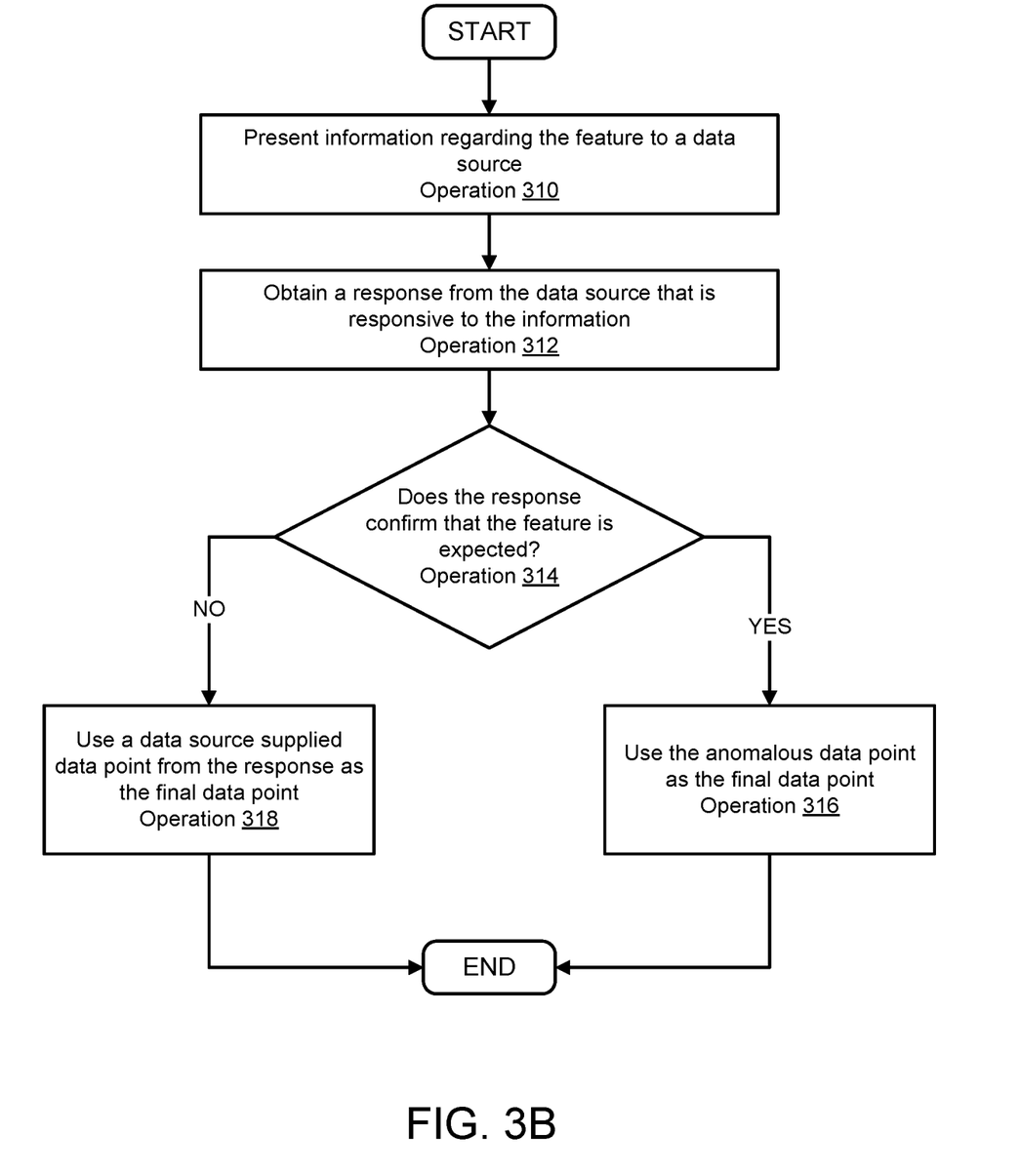
FIG. 3B shows a flow diagram illustrating a method for obtaining a final data point for an anomalous data point in accordance with an embodiment.

When performing its functionality, data sources 100, data manager 102, and/or downstream consumers 104 may perform all, or a portion, of the methods and/or actions shown in FIGS. 2-3B.

Data sources 100, data manager 102, and/or downstream consumers 104 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

In an embodiment, one or more of data sources 100, data manager 102, and/or downstream consumers 104 are implemented using an internet of things (IoT) device, which may include a computing device. The IoT device may operate in accordance with a communication model and/or management model known to data sources 100, data manager 102, downstream consumers 104, other data processing systems, and/or other devices.

Any of the components illustrated in FIG. 1 may be operably connected to each other (and/or components not illustrated) with a communication system 101. In an embodiment, communication system 101 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

While the above example relates to targeted advertising models, it will be appreciated that data may be collected and/or stored in data repositories in order to provide other types of computer-implemented services without departing from embodiments disclosed herein.

The system described in FIG. 1 may be used to curate data through interaction with a data source that provided the data. Interacting with the data source to facilitate data curation may prevent and/or reduce potential negative effects of uncurated (and/or partially curated) curated data in the downstream use of the data. The following operations described in FIG. 2 may be performed by the system in FIG. 1 when providing this functionality.

Turning to FIG. 2, a data flow diagram is shown in accordance with an embodiment. The data flow diagram may illustrate a process for curating data including an anomalous data point through interaction with a data source in a system similar to that of FIG. 1.

As discussed with respect to FIG. 1, data sources 100 may provide data for use by downstream consumers 104 to facilitate the provision of computer-implemented services. Before being provided to downstream consumers 104, the data (e.g., collected data) may undergo a data curation process. The data curation process may include collecting, organizing, and/or transforming the collected data into data usable by downstream consumers 104 using data curation resources.

Collected data obtained from data sources 100 (e.g., collected data) may include any number of datasets collected from any number of data sources. The collected data may include any number of data points, each data point of the data points potentially requiring curation prior to being used by the data pipeline.

The collected data may undergo anomaly detection process 202. Anomaly detection process 202 may include any process usable to identify anomalies in the collected data. For example, anomaly detection process 202 may be performed using: (i) an artificial neural network, (ii) a cluster analysis, (iii) an isolation forest, and/or (iv) any other method of anomaly detection.

In FIG. 2, an anomalous data point of the collected data may be identified as part of anomaly detection process 202. The anomalous data point may indicate a portion of the collected data that may benefit from data curation (e.g., verifying whether the anomalous data point is an erroneous anomaly or a real anomaly in the collected data, etc.) in order to be usable in downstream applications of the data. In other words, the identified anomalous data point may include a portion of data that is desired to be curated. The anomalous data point may be subject to multiple valid but contrasting interpretations which may, therefore, require intervention (e.g., curation) to identify a preferred interpretation (e.g., by data sources 100) for the anomalous data point. The multiple valid but contrasting interpretations may include, for example, the anomalous data point being anomalous and/or the data point being erroneously anomalous (e.g., considered anomalous due to an error in one or more features associated with the data point).

For example, continuing with the targeted advertising example, an anomalous data point of the personal information may include one or more data points, such as locations (e.g., latitude and/or longitude of the position of a user), an address of a user, an age of a user, etc. The anomalous data point may include information regarding any number of features, such as feature types (e.g., a text string or a numerical value), feature contents (e.g., a minimum or maximum number of characters per field), etc. The anomalous data point may also include a subset of data points (of all data points of the collected data). For example, the anomalous data point may include all personal information collected from portable electronic devices used to purchase an item from a specific online vendor during a duration of time.

The anomalous data point may include, for example, one or more user submitted qualitative descriptions of the temperature on a particular day. The user submitted descriptions may include terms such as "high," "low," "hot," "cold," etc. Therefore, the anomalous data point may include a set of information associated with the weather for a particular day including the user submitted descriptions. Specifically, the data point may include the following features: (i) a user's home address, (ii) average temperature measurements for the day, (iii) average humidity data for the day, (iv) average precipitation for the day, (v) the user's submitted qualitative descriptions of the temperature for the day, and/or (vi) other information.

To utilize the anomalous data point in the data pipeline, the anomalous data point may require verification (e.g., as the presence of anomalies in the data pipeline may initiate action sets to remediate and/or further interrogate the anomalies). Verification of the anomalies prior to populating the data pipeline with the anomalous data point may, therefore, reduce unnecessary expenditure of curation resources. The anomalous data point may be verified by a data curator (if sufficient data curation resources are available and/or if the data is not subjective to the user). However, sufficient data curation resources may not be available and, in addition, one or more features associated with the anomalous data point may be subjective to the user (e.g., data sources 100). Therefore, the system of FIG. 1 may attempt to verify the anomalous data point without intervention by a data curator (and/or expenditure of excess data curation resources).

To do so, the anomalous data point may be used for importance criteria comparison process 204. Importance criteria comparison process 204 may include: (i) identifying a set of features associated with the anomalous data point, (ii) comparing each feature of the set of the features to importance criteria (not shown), (iii) identifying any features of the set of the features that meet the importance criteria, and/or (iv) other actions. The importance criteria may be met when a feature contributes sufficiently (e.g., to an extent determined by an entity such as the downstream consumer and indicated by the importance criteria) to the identification of an anomaly in the collected data.

In FIG. 2, a feature of a set of features associated with the anomalous data point obtained from anomaly detection process 202 may meet the importance criteria and, therefore, may contribute sufficiently to the identification of the anomalous data point to warrant verification (e.g., curation). Following the determination that the feature meets the importance criteria, the system of FIG. 1 may interact with data sources 100 to verify the feature.

To do so, anomaly verification process 206 may be performed. Anomaly verification process 206 may include an interaction (e.g., providing of a verification request) with data sources 100. The interaction with data sources 100 may include presenting information regarding the anomalous data point (e.g., the feature) to data sources 100, the information being usable to confirm whether the feature is expected by data sources 100. Therefore, the verification request may include: (i) the anomalous data point, (ii) the feature, and/or (ii) other information usable by data sources 100 to confirm whether the feature (and, therefore, the anomalous data point) is expected (e.g., should be added to the data pipeline without changes).

Continuing with the above example, the validation request may be provided to data sources 100 via a graphical user interface (GUI). The GUI may include: (i) the feature (e.g., a user submitted qualitative description), (ii) functionality for data sources 100 to indicate whether the feature is expected, (iii) functionality for data sources 100 to provide an alternative feature (e.g., a corrected qualitative description) if the feature is unexpected (e.g., inaccurate), and/or (v) other information.

Data sources 100 may provide a response, the response being responsive to the verification request and the response indicating whether the feature is expected and, therefore, the anomalous data point should be added to the data pipeline. The response may include: (i) an indication of a verification of the feature, (ii) an indication of a rejection of the feature, (iii) a data source supplied data point suggested to replace the anomalous data point, and/or (iv) any other information.

Anomaly verification process 206 may also include analyzing the response to obtain final data point 208. Final data point 208 may be based on one of the multiple valid but contrasting interpretations as selected by data sources 100 through the interaction (e.g., the verification request). For example, final data point 208 may include one of the user submitted qualitative descriptions. Depending on the feedback included in the response, final data point 208 may include the anomalous data point (e.g., if data sources 100 indicated in the response that the anomalous data point is accurate), and/or (ii) any other value (e.g., if data sources 100 indicated that the data source supplied data point may be used to replace the anomalous data point, etc.).

The data pipeline may be populated with final data point 208 and may be treated as curated data. Final data point 208 may undergo additional curation and/or may be provided to the downstream consumer for use in providing computer-implemented services.

In an embodiment, the one or more entities performing the operations shown in FIG. 2 are implemented using a processor adapted to execute computing code stored on a persistent storage that when executed by the processor performs the functionality of the system of FIG. 1 discussed throughout this application. The processor may be a hardware processor including circuitry such as, for example, a central processing unit, a processing core, or a microcontroller. The processor may be other types of hardware devices for processing information without departing from embodiments disclosed herein.

As discussed above, the components of FIG. 1 may perform methods for data curation by a data manager. The methods may include identifying anomalous data points and/or interacting with a data source to curate the anomalous data points when data curation resources are limited (e.g., when sufficient data curation resources are unavailable to curate all collected data within a target period of time). FIGS. 3A-3B illustrate methods that may be performed by the components of FIG. 1. In the diagrams discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method for curating data including an anomalous data point through interaction with a data source in accordance with an embodiment is shown. The method may be performed by a data processing system, and/or another device.

At operation 300, an identification is made that data obtained from a data source associated with the data pipeline includes an anomalous data point. Making the identification may include: (i) identifying the anomalous data point by performing an anomaly detection process (e.g., using a cluster analysis, using an isolation forest method, using a neural network, etc.) using the data, (ii) receiving a notification from another entity that the data includes the anomalous data point, (iii) reading a label from storage for the data, the label indicating that the data includes the anomalous data point, and/or (iv) other methods.

At operation 302, a feature of a set of features associated with the anomalous data point that meets importance criteria is identified. Identifying the feature may include: (i) obtaining the set of the features, (ii) obtaining the importance criteria, (iii) making a comparison between each feature of the set of the features to the importance criteria, (iv) obtaining the feature based on the comparison, and/or (v) other methods.

Obtaining the set of the features may include: (i) generating the set of the features, (ii) reading the set of the features from storage, (iii) receiving the set of the features from another entity in the form of a message over a communication system, and/or (iv) other methods.

Generating the set of the features may include: (i) obtaining the anomalous data point, and/or (ii) parsing the anomalous data point to obtain the set of the features. Each feature of the set of the features may include: (i) one or more letters, (ii) one or more numbers, (iii) one or more words, and/or (iv) other features.

Obtaining the importance criteria may include: (i) reading the importance criteria from storage, (ii) receiving the importance criteria in the form of a message transmitted over a communications system from another entity, (iii) generating the importance criteria based on preferences and/or rules provided by an entity (e.g., a downstream consumer, etc.), and/or (iv) other methods.

Making the comparison between each feature of the set of the features and the importance criteria may include: (i) obtaining a quantification of local feature importance (e.g., via use of a decision tree, via identifying coefficients of a model, via performing permutation testing, and/or any other methodology to identify local feature importance) for each feature of the set of the features, and/or (ii) comparing the quantification of the local feature importance to a threshold for local feature importance indicated by the importance criteria.

Making the comparison between each feature of the set of the features and the importance criteria may also include: (i) providing the set of the features and/or the importance criteria to another entity responsible for comparing the set of the features to the importance criteria, and/or (ii) receiving a notification from the entity indicating whether the set of the features meets the importance criteria.

Obtaining the feature based on the comparison may include identifying a feature (or features) of the set of the features that has a local feature importance that meets the threshold, and/or (ii) treating the feature and/or features that has the local feature importance that meets the threshold as the feature.

At operation 304, a final data point is obtained based on the feature and through an interaction with the data source. Obtaining the final data point for the anomalous data point may include: (i) presenting information regarding the feature to a data source, (ii) obtaining a response from the data source that is responsive to the information, and/or (iii) determining whether the response confirms that the feature is expected. If the response indicates that the feature is expected, the anomalous data point may be used as the final data point. If the response does not indicate that the anomalous data point is expected, a data source supplied data point from the response may be used as the final data point. Refer to FIG. 3B for additional details regarding obtaining the final data point.

At operation 306, the data pipeline is populated with the final data point. Populating the data pipeline with the final data point may include: (i) adding the final data point to the data pipeline, and/or (ii) providing the final data point to another entity responsible for populating the data pipeline.

Adding the final data point to the data pipeline may include: (i) storing the final data point in a data repository (e.g., a data warehouse, a data lake, etc.) associated with the data pipeline, (ii) providing the final data point to a downstream consumer associated with the data pipeline (e.g., via one or more APIs), and/or (iii) other methods.

Following populating the data pipeline with the final data point, the system may also: (i) remove the anomalous data point from the data pipeline (e.g., if the final data point does not match the anomalous data point), (ii) provide computer-implemented services using the final data point from the populated data pipeline, and/or (iii) perform other actions.

Removing the anomalous data point from the data pipeline may include: (i) deleting the anomalous data point from the data repository associated with the data pipeline, (ii) providing a notification to another entity, the notification indicating instructions for removing the anomalous data point from the data pipeline, (iii) transferring the anomalous data point from the data pipeline (e.g., the data repository, etc.) to another storage architecture separate from the data pipeline, and/or (iv) other methods.

Providing the computer-implemented services using the final data point from the populated data pipeline may include: (i) providing the final data point (and/or other portions of the data) to another entity (e.g., a downstream consumer), (ii) feeding the final data point (and/or other portions of the data) into an inference model to generate inferences based on the data, (iii) using the final data point (and/or other portions of the data) as training data to train an inference model, (iv) storing the final data point (and/or other portions of the data) in storage, and/or (v) other methods.

The method may end following operation 306.

Turning to FIG. 3B, a flow diagram illustrating a method for obtaining a final data point in accordance with an embodiment is shown. The method may be performed by a data processing system, and/or another device. The operations shown in FIG. 3B may be an expansion of operation 304 shown in FIG. 3A.

At operation 310, information regarding the feature is presented to a data source. Presenting the information may include: (i) transmitting the information over a communications system (e.g., in the form of a message), (ii) transmitting the information to another entity responsible for providing the information to the data source, (iii) providing instructions (e.g., directions to access a website, an application on a device, etc.) and/or access credentials for the data source to interact with a GUI, the GUI presenting the information to the data source, (iv) storing the information in storage (e.g., a database) and transmitting a notification to the data source that the information is available (e.g., from the database), and/or (v) other methods.

At operation 312, a response is obtained from the data source that is responsive to the information. Obtaining the response may include: (i) receiving a transmission from the data source, the transmission including the response, (ii) receiving a notification from the data source that the response is available in a database (e.g., the database being accessible using access credentials, etc.), (iii) receiving the response from another entity, the other entity previously receiving the response from the data source, (iv) receiving a report, the report indicating selections made by the data source when interacting with the GUI, and/or (v) other methods.

At operation 314, it is determined whether the response confirms that the feature is expected. Determining whether the response indicates that the feature is expected may include: (i) obtaining a report based on the response, the report being based on feedback provided by the data source (e.g., via an API, GUI, etc.), and/or (ii) interpreting the report to determine whether the data source indicated that the feature was expected.

Interpreting the report may include reading a set of answers to questions provided to the data source (e.g., via a GUI, API, etc.), at least one of the set of the answers indicating whether the feature is expected.

Determining whether the response indicates that the feature is expected may also include receiving a notification from another entity, the notification including an analysis of the response and an indication of whether the response indicates that the feature is expected.

If the response indicates that the feature is expected, the method may proceed to operation 316. If the response does not indicate that the feature is expected, the method may proceed to operation 318.

At operation 316, the anomalous data point is used as the final data point. Using the anomalous data point as the final data point may include: (i) modifying a label associated with the anomalous data point in storage, the label indicating that the anomalous data point should be treated as the final data point, (ii) transmitting a notification to another entity that the anomalous data point should be treated as the final data point, (iii) storing the anomalous data point in any storage architecture that includes one or more final data points, and/or (iv) other methods.

The method may end following operation 316.

At operation 318, a data source supplied data point from the response is used as the final data point. Using the data source supplied data point from the response as the final data point may include: (i) deleting the anomalous data point from storage, (ii) interpreting the report based on the response, the report including data source provided input based on the anomalous data point (e.g., the data source provided input including the data source supplied data point), (iii) modifying a label associated with the data source supplied data point in storage, the label indicating that the data source supplied data point should be treated as the final data point, (iv) storing the data source supplied data point in any storage architecture associated with the data pipeline, and/or (v) other methods.

The method may end following operation 318.

Figure 4:
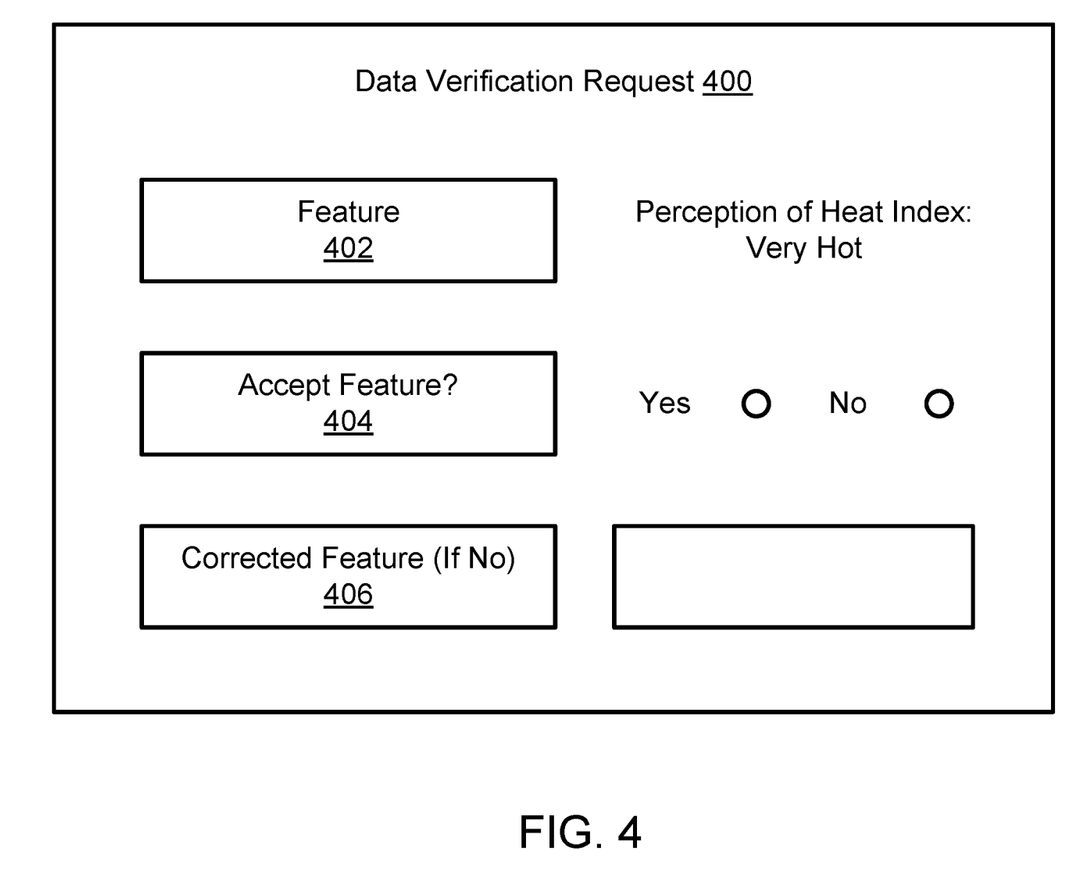
FIG. 4 shows a block diagram illustrating a system in accordance with an embodiment over time.

Turning to FIG. 4, consider a scenario in which data intended for use by a data pipeline is obtained from a data source. The data may be screened to identify anomalous data points (e.g., data points that may require curation). Following identification of an anomalous data point, any feature associated with the anomalous data point that meets importance criteria may be provided to the data source for verification prior to adding the anomalous data point to the data pipeline.

FIG. 4 shows data verification request 400, data verification request 400 including a display on a GUI with which the data source (e.g., an entity managing the data source) may interact. Data verification request 400 may include Feature 402 (e.g., a user supplied perception of heat index for a particular day). Feature 402 may be considered anomalous due to other features (e.g., an average temperature measurement for the day and city in which the user resides conflicting with the perception of the heat index being "very hot.")

Data verification request 400 may also include functionality for the data source to respond to accept feature 406. Accept feature 406 may include two options: (i) an option to select yes to indicate that feature 402 is expected (e.g., not an error), and (ii) an option to select no to indicate that feature 402 is not expected (e.g., is an error). If the data source selects no, the data source may also respond to corrected feature (if no) 406. Corrected feature (if no) 406 may include a text box in which the data source may manually add (e.g., type in) an alternative perception of the heat index included in feature 402.

The data source may submit a response to data verification request 400 and, subsequently, may contribute to curation of anomalous data without consumption of limited data curation resources. For example, the data source may indicate no for accept feature 404 and may type in "Very Cold" as a response to corrected feature (if no) 406.

Figure 5:
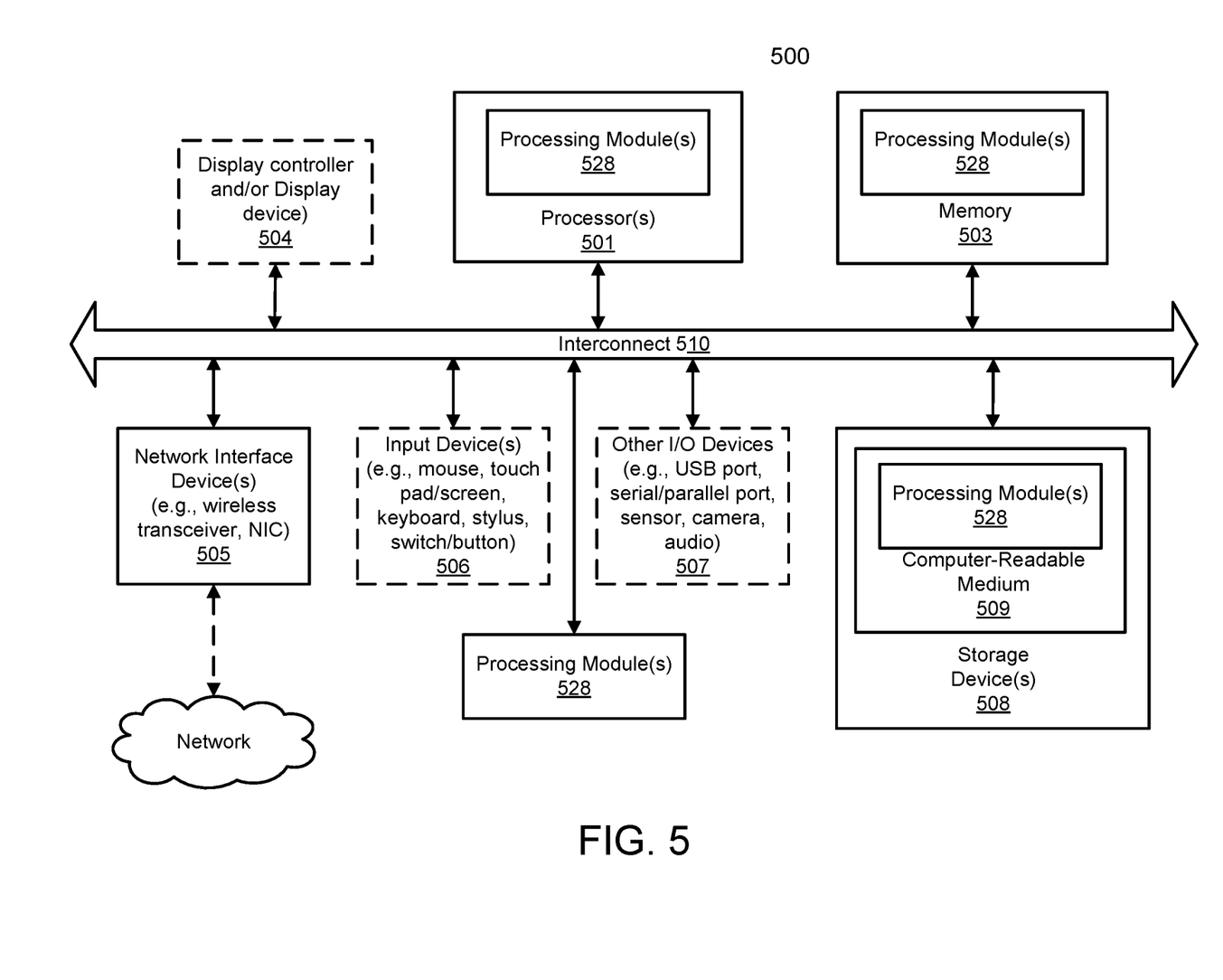
FIG. 5 shows a block diagram illustrating a data processing system in accordance with an embodiment.

Any of the components illustrated and/or described with respect to FIGS. 1-4 may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high-level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random-access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs, or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such, details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of curating data by a data manager, the method comprising:
    making an identification that data obtained from a data source associated with a data pipeline comprises an anomalous data point;
    identifying a feature of a set of features associated with the anomalous data point that meets importance criteria;
    obtaining a final data point based on the feature and through an interaction with the data source; and
    populating the data pipeline with the final data point to provide the final data point to a downstream consumer of the data pipeline using one or more application programming interfaces (APIs) associated with the data pipeline, wherein populating the data pipeline with the final data point comprises storing the final data point in a data repository associated with the data pipeline, and
    wherein the final data point is populated into the data pipeline to prevent the anomalous data point from being provided to a data consumer and negatively impacting operations and functionalities of a data processing system that uses the data in the data pipeline in one or more processes executed by the data processing system for providing computer-implemented services to the downstream consumer.

2. The method of claim 1, wherein the anomalous data point is subject to multiple valid but contrasting interpretations.

3. The method of claim 2, wherein the final data point is based on one of the multiple valid but contrasting interpretations as selected by the data source through the interaction.

4. The method of claim 1, wherein the interaction comprises presenting information regarding the feature to the data source, the information being usable to confirm whether the feature is expected by the data source.

5. The method of claim 4, wherein obtaining the final data point comprises:
    obtaining a response from the data source that is responsive to the information;
    in a first instance of the obtaining where the response confirms that the anomalous data point is expected:
        using the anomalous data point as the final data point; and
    in a second instance of the obtaining where the response rejects the anomalous data point as being expected:
        using a data source supplied data point from the response as the final data point.

6. The method of claim 1, further comprising:
    removing the anomalous data point from the data pipeline.

7. The method of claim 1, further comprising:
    providing computer-implemented services using the final data point from the populated data pipeline.

8. A non-transitory machine-readable medium having instructions stored therein, which when executed by a processor, cause the processor to perform operations for curating data by a data manager, the operations comprising:
    making an identification that data obtained from a data source associated with a data pipeline comprises an anomalous data point;
    identifying a feature of a set of features associated with the anomalous data point that meets importance criteria;
    obtaining a final data point based on the feature and through an interaction with the data source; and
    populating the data pipeline with the final data point to provide the final data point to a downstream consumer of the data pipeline using one or more application programming interfaces (APIs) associated with the data pipeline, wherein populating the data pipeline with the final data point comprises storing the final data point in a data repository associated with the data pipeline, and
    wherein the final data point is populated into the data pipeline to prevent the anomalous data point from being provided to a data consumer and negatively impacting operations and functionalities of a data processing system that uses the data in the data pipeline in one or more processes executed by the data processing system for providing computer-implemented services to the downstream consumer.

9. The non-transitory machine-readable medium of claim 8, wherein the anomalous data point is subject to multiple valid but contrasting interpretations.

10. The non-transitory machine-readable medium of claim 9, wherein the final data point is based on one of the multiple valid but contrasting interpretations as selected by the data source through the interaction.

11. The non-transitory machine-readable medium of claim 8, wherein the interaction comprises presenting information regarding the feature to the data source, the information being usable to confirm whether the feature is expected by the data source.

12. The non-transitory machine-readable medium of claim 11, wherein obtaining the final data point comprises:
   obtaining a response from the data source that is responsive to the information;
   in a first instance of the obtaining where the response confirms that the anomalous data point is expected:
      using the anomalous data point as the final data point; and
   in a second instance of the obtaining where the response rejects the anomalous data point as being expected:
      using a data source supplied data point from the response as the final data point.

13. The non-transitory machine-readable medium of claim 8, wherein the operations further comprise:
   removing the anomalous data point from the data pipeline.

14. The non-transitory machine-readable medium of claim 8, wherein the operations further comprise:
   providing computer-implemented services using the final data point from the populated data pipeline.

15. A data processing system, comprising:
   a processor; and
   a memory coupled to the processor to store instructions, which when executed by the processor, cause the processor to perform operations for curating data by a data manager, the operations comprising:
      making an identification that data obtained from a data source associated with a data pipeline comprises an anomalous data point;
      identifying a feature of a set of features associated with the anomalous data point that meets importance criteria;
      obtaining a final data point based on the feature and through an interaction with the data source; and
      populating the data pipeline with the final data point to provide the final data point to a downstream consumer of the data pipeline using one or more application programming interfaces (APIs) associated with the data pipeline, wherein populating the data pipeline with the final data point comprises storing the final data point in a data repository associated with the data pipeline, and
      wherein the final data point is populated into the data pipeline to prevent the anomalous data point from being provided to a data consumer and negatively impacting operations and functionalities of a data processing system that uses the data in the data pipeline in one or more processes executed by the data processing system for providing computer-implemented services to the downstream consumer.

16. The data processing system of claim 15, wherein the anomalous data point is subject to multiple valid but contrasting interpretations.

17. The data processing system of claim 16, wherein the final data point is based on one of the multiple valid but contrasting interpretations as selected by the data source through the interaction.

18. The data processing system of claim 15, wherein the interaction comprises presenting information regarding the feature to the data source, the information being usable to confirm whether the feature is expected by the data source.

19. The method of claim 1, wherein populating the data pipeline with the final data point further comprises:
   removing the anomalous data point from the data pipeline while the data pipeline is being populated with the final data point.

20. The method of claim 19, wherein removing the anomalous data point from the data pipeline comprises deleting the anomalous data point from the data repository associated with the data pipeline.

* * * * *